United States Patent [19]

Lathrop

[11] Patent Number: 4,613,728

[45] Date of Patent: Sep. 23, 1986

[54] ELECTRICAL OUTLET BOX ENCLOSURE

[76] Inventor: Deborah A. Lathrop, 191 Hamilton St., Cambridge, Mass. 02139

[21] Appl. No.: 714,461

[22] Filed: Mar. 21, 1985

[51] Int. Cl.$^4$ .............................................. H02G 3/08
[52] U.S. Cl. ...................................... 174/53; 174/67; 339/119 C
[58] Field of Search ................ 174/48, 53, 66, 67; 220/3.2, 3.92, 3.94, 241, 242; 339/36, 119 C, 122 R, 122 F

[56] References Cited

U.S. PATENT DOCUMENTS

| | | | |
|---|---|---|---|
| 3,013,105 | 12/1961 | Craig | 174/67 |
| 3,257,497 | 6/1966 | Chase | 174/66 |
| 3,293,588 | 12/1966 | Blonder | 174/67 X |
| 3,622,029 | 11/1971 | Ware | 220/3.94 X |
| 3,689,868 | 9/1972 | Snyder | 174/66 X |
| 3,690,501 | 9/1972 | Ware | 220/3.94 |
| 4,302,624 | 11/1981 | Newman | 174/67 |

FOREIGN PATENT DOCUMENTS 939117  10/1963  United Kingdom .................. 174/67

Primary Examiner—Arthur T. Grimley
Assistant Examiner—D. A. Tone
Attorney, Agent, or Firm—Donald N. Halgren

[57] ABSTRACT

An enclosure box for receiving an electrical receptacle unit therein. The box has movable hangers adaptable for holding electrical cords which are attached to plugs mated with the receptacle unit. The hangers may pivot or snap outwardly to facilitate winding of cords therearound, and then snap back to hold cords in place. The enclosure box has a movable door on its front face. The movable door is attached to a frame on the front of the box. The frame may be flush with the face of any wall into which the enclosure box is mounted. The movable door has an opening along one side thereof, through which any electrical cord may pass when the door is closed. The movable door may also be removable from the enclosure box and relockable thereon. The enclosure box permits receptacles and the plugs and cords thereattached, to be disposed out of the way of furniture, appliances and curious children.

12 Claims, 3 Drawing Figures

ELECTRICAL OUTLET BOX ENCLOSURE

BACKGROUND OF THE INVENTION (1) Field of the Invention

This invention relates to electrical outlets and more particularly to enclosures for recessing electrical outlet boxes which can be closed.

(2) Prior Art

Problems which arise with standard electrical outlets include plugs being in the way of furniture, appliances or bookcases or the like, which often happen to be in front of them. Standard outlets also do not provide means for keeping the cords that are attached to those plugs out of the way or hidden and enclosed from view and from children's fingers.

U.S. Pat. No. 2,987,909 shows an electrical wall outlet box which has a locking cover assembly. There is, however, no showing of egress for a cord, nor means for stowing a cord. U.S. Pat. No. 3,930,116 shows an outlet face plate having brackets which hold an electrical cord. They do not hide the cord and the outlet box is not enclosable. U.S. Pat. No. 4,059,327 discloses a recessed electrical outlet, which is not closable, nor does it have cord storage means. The '327 Patent requires, however, a deeper than normal electrical box. This creates a problem for usage in inside walls which normally would not be thick enough to provide for a recessed enclosure of an electrical box.

None of the prior art provides for an enclosable electrical outlet box having means for cord storage, and which permits use of an enclosable box in a wall of normal thickness.

It is an object of the present invention to provide an enclosure arrangement for an electric outlet unit not realized by the prior art.

It is a further object of the present invention, to provide an electrical outlet enclosure box which can be retrofitted to provide a closable, cord storable outlet unit utilizable in a wall of normal thickness, that is, walls which may be only about 4 inches thick, which is slightly larger than the width of an electrical outlet box.

BRIEF SUMMARY OF THE INVENTION

The present invention relates to enclosure boxes for enclosing and covering electrical outlets or other electrical devices. The box comprises a unitary structure having a face side which is openable. One or more side portions of the box may have L-shaped flanges attached thereto, for securing the box to a wooden stud in the wall of a building. One side wall of the box has several openings through which an electrical socket arrangement may be disposed. This permits electrical "adaptors" or plug attachments to be safely utilized within the enclosure box and not be obtrusively sticking out from a wall or the back panel of the enclosure box where it might otherwise be knocked loose. The electric socket arrangement is attachable through standard means, preferably to the side wall of the box. The electric socket arrangement may however be disposed through the rear wall of the enclosure box, but this would generally require a greater thickness of the wall to receive both the enclosure box and the outlet box (electrical device), and may limit its use in some walls, because of the wall's relative thinness.

The indented enclosure box has a rear wall which may have a cord securement means thereon. The cord securement means comprises a clip arrangement around which extra unused lengths of electrical cord might be wound or stored. The remainder of the cord may be extended directly to the appliance. The clip arrangement is fastened by standard means such as by bolts or welding to the rear wall and has a pair of arms, the distal portions of which are articulable. The arms would be swingable toward the open wall portion of the enclosure box when electrical cord is to be wound thereabout or removed (unwound) therefrom. The arms otherwise, would be pivotable away from one another and holdable in that position by biasing means to effectuate cord storage within the enclosure box. This permits a portion of the cord or an entire extension cord to be stored conveniently in a place where it is needed, yet out of reach from children and hidable until use thereof is necessary.

The open or front wall of the enclosure box may be closable by a movable door attachable thereto. A rectangular frame would be disposed onto the periphery of the front wall of the enclosure box once the box and its associated electrical socket arrangement has been properly wired in the wall and the wall face has been properly finished or the peripheral frame may be comprised of a lip or flange as part of the side wall panels.

In one embodiment, the door is pivotably attached to an upper corner of the frame on the front of the enclosure box. The door is swingable out of the way, about an axis which secures it to the frame, when the plug and or cord needs attendance. The door otherwise is enclosable over the entire front face of the outlet box, except preferably for a rectangular opening along its lower side, to permit an electrical cord(s) to extend therefrom. The door swings in a plane immediately adjacent and parallel to the plane of the wall, thus minimizing any obtrusive features of an electrical outlet with anything such as furniture, bookcases or inquiring children's fingers. The door may be snap lockable or otherwise securable to the frame on the front of the enclosure box. The axis about which the door swings may have a spring around it to "pull" the door into its place in the frame or lip around the front of the enclosure box.

A further embodiment of the enclosure box comprises the enclosure box as aforementioned, but with a frame attachable to the open side of the box about double the width of the face of the box. This frame would provide means for holding a slidable door. When the slidable door is open, it would have behind it, a panel of equal width. When the sliding door was closed to cover the open face of the enclosure box, it would expose the previously covered panel. The sliding door of this embodiment would preferably also have a rectangular cut-out along a portion of its lower edge, to permit any electrical cord(s) within the enclosure box to extend out therefrom to whatever electrical appliance it is attached. The sliding door could be similarly snap closable or lockable, and would slide in grooves or tracks in its frame on the front of the enclosure box.

Another embodiment for the front door of the enclosure box comprises an entirely removable panel, having snap or clip means on two sides thereof which secure the front door to the frame or lip of the enclosure box when the door is inserted therein. The door in this embodiment would also have an opening along a portion of its lower edge thereof, to permit passage of any electrical cord(s) therepast, as disclosed in the other embodiments.

A clip mounted on the bottom wall panel of the enclosure box is arranged so as to secure the electric cord(s) close to the bottom wall and prevent rubbing and chaffing of the cord(s) by the movable door of the front wall of the outlet box for each of the above-identified embodiments.

The enclosure box may be adapted so as to be retrofittable with respect to standard electric socket arrangements, once existing standard electric outlet box units have been removed or attached to the side of the enclosure box, the enclosure box then being securable into the wall cavity where the standard electric outlet box was originally located.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

Figure 1:
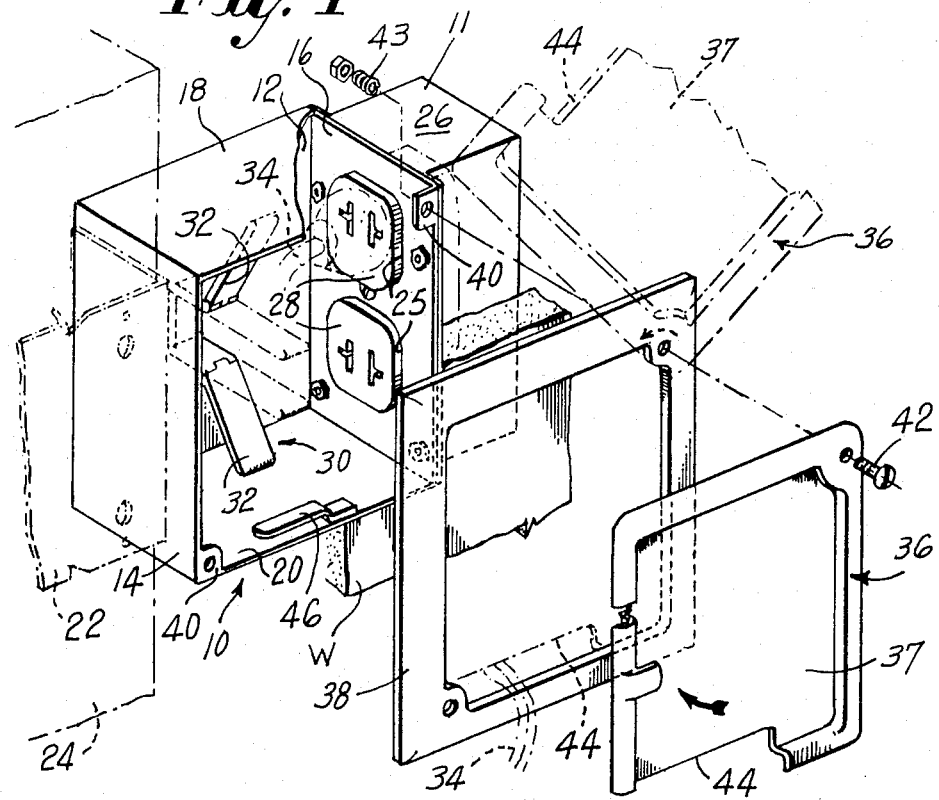
FIG. 1 is an exploded perspective view of one embodiment of an electrical outlet enclosure box constructed according to the principles of this invention.

Referring now to the drawings in detail, and particularly to FIG. 1, there is shown a enclosure box 10 for enclosing and covering at least the front face of an electrical outlet 11. The enclosure box 10 comprises a structure, preferably formed from sheet material such as metal or plastic, having a rear (wall) panel 12, a left and a right side (wall) panel 14 and 16, and a horizontally disposed top and a bottom (wall) panels 18 and 20. At least one of the side panels 14 or 16, or one of the horizontal panels 18 or 20 or the outlet 11 itself, attached to the enclosure box 10, could have an L-shaped flange 22 secured thereto, as shown in phantom lines in FIG. 1 on the left panel 14, or in FIG. 3 on the outlet 11 for attaching the enclosure box 10 to a wall stud 24, by standard means, not shown.

One of the panels, preferably a side panel 14 or 16, as shown in FIG. 1, has a pair of openings 25 therein, through which an electrical device 26 such as the front of an electrical outlet 11 may be disposed. The electrical device 26, as shown in FIG. 1, comprises the electrical outlet 11, and has an electrical socket arrangement 28, adapted to receive plug(s) on the end(s) of electrical cord(s). The electrical device 26 such as the outlet box 11, may be securable by standard means to the side panel 16 of the enclosure box 10. The electrical device 26 may be disposed through the rear panel 12, however this would require a greater thickness of any wall which would receive the enclosure box 10, and would thereby limit the use thereof.

A cord securement means is attached preferably to the rear wall panel 12. The cord securement means comprises a clip arrangement 30 around which surplus or unused lengths of electrical cord might be wound and stored. The clip arrangement 30 is preferably a U-shaped member the base of which is attached to the rear wall panel 12 by standard means, and has a pair of arms 32 the distal portion of which are articulable, in snap fashion, to be generally parallel to one another, so as to point generally away from the rear panel 12, as shown in phantom lines in FIGS. 1 and 2, for loading or unloading of electrical cord thereabout, and to snap into a "holding or locking" position so as to be generally parallel to the rear panel 12. A cord 34, may be wound around the base U-shaped portion of the clip 30, and held securely in place once the distal portions of the clip 30 are snapped into position.

The enclosure box 10 has an open or front wall which may be closable or sealable by a movable door 36 attachable thereto and movable parallel to any wall W within which the enclosure box 10 is attached. A rectangular (or square) frame 38 is securably attached by bolts or the like, to a plurality of tabs 40 on the front periphery of the enclosure box 10.

The movable door 36 in the first embodiment shown in FIG. 1, comprises a panel 37 pivotable about a bolt 42 which is also utilized to secure the frame 38 to one of the tabs 40. The bolt 42 may have a spring 43 thereon to bias the door 36 into the opening of the frame 38 when the door 36 is closed. The frame 38 may be generally flush with any wall in which the enclosure box 10. A rectangular opening 44 is preferably arranged in the lower side of the door 36, of sufficient dimension to permit several electrical cords to extend therethrough. A spring clip 46 may be disposed on the inside of the lower panel 20 adjacent the opening 44 in the movable door 36, to hold any electrical cord(s) securely against the lower wall 20 to prevent them from rubbing or chafing against the movable door 36 when it is opened and closed.

Figure 2:
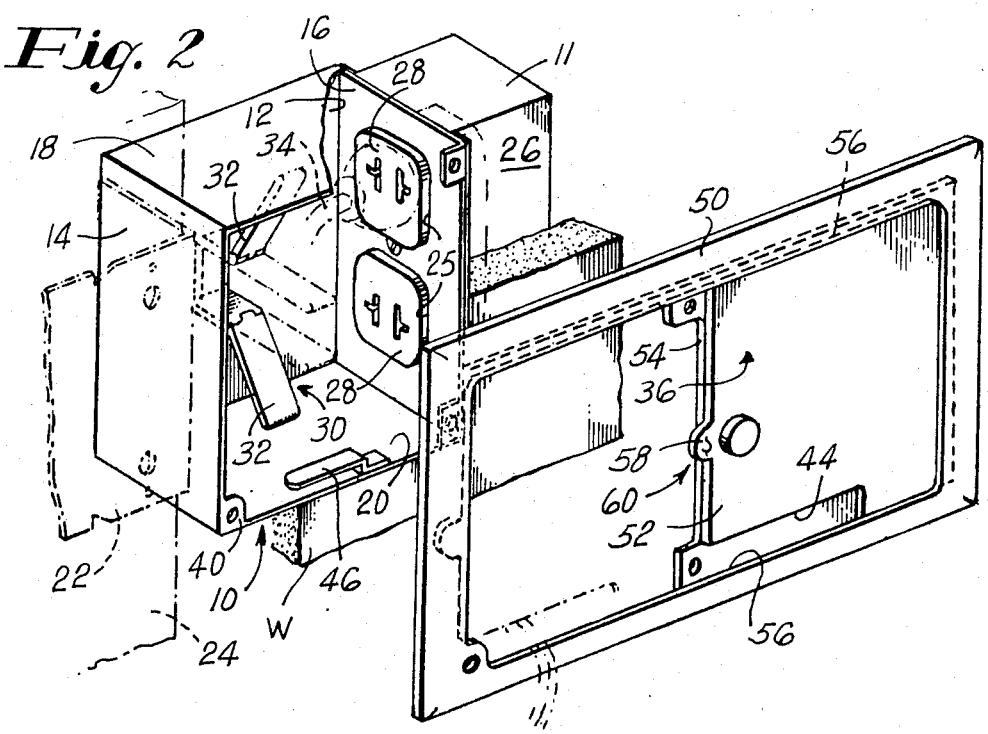
FIG. 2 is an exploded perspective view of a further embodiment of the outlet enclosure box shown in FIG. 1.

The enclosure box 10 shown in FIG. 2 is generally similar to that shown in FIG. 1, except that a larger frame 50 is secured to the front face of the box 10, the frame 50 being about twice the width of the box 10. The movable door 36, shown in FIG. 2, comprises a slidable panel 52 and a stationary panel 54. The slidable panel 52 is movable from side to side, in grooves or tracks 56 in the frame 50. The slidable panel 52 may have a spring tab 58 or locking means 60 thereon, by which the panel 52 may be locked in the closed position in the frame 50. The slidable panel 52 preferably has the same type of opening 44 across its lower portion as did the movable door 36 in the previous embodiment. The outer front surface of the frame 50 in this embodiment may be adapted so as to be flush with any wall W, as was the aforementioned frame 38.

The enclosure box 10 embodiments described herein may be adapted to be retrofittable in existing wall spaces, once the standard plug outlet receptacle 11 has been removed or separated from its position on a wall stud and mated through (and secured) to one of the wall panels of the present enclosure box as hereinbefore described.

Figure 3:
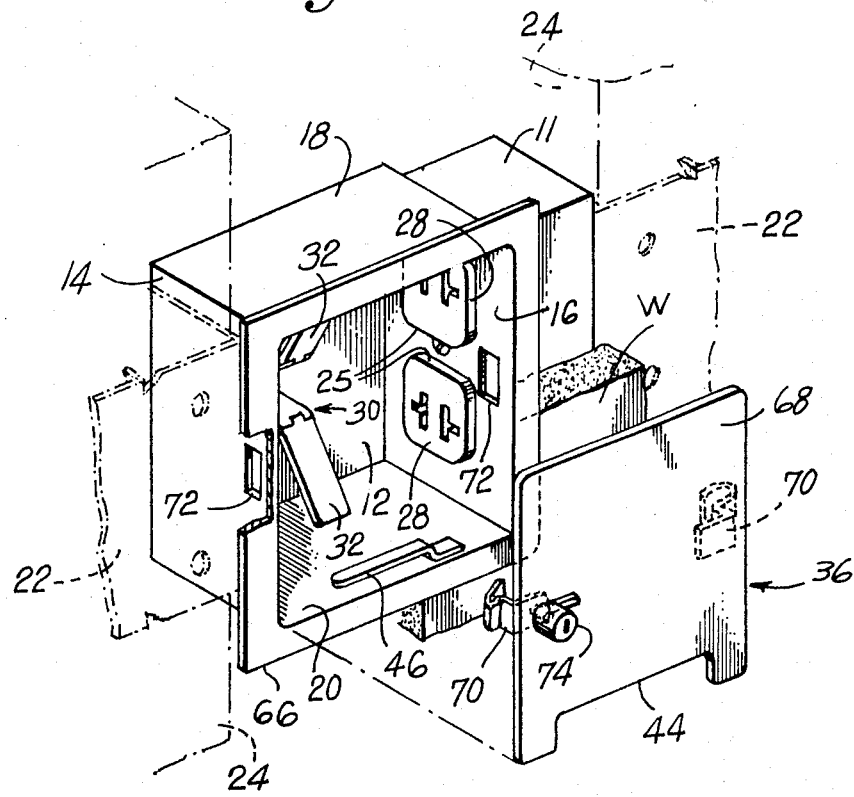
FIG. 3 is an exploded perspective view of yet a further embodiment of the outlet enclosure box shown in FIG. 1.

The enclosure box 10 shown in FIG. 3 in a further embodiment is generally similar to those shown in FIGS. 1 and 2, except that a flange 66 or lip is formed directly as part of the side panels 14 and 16 and the lower and upper panels 20 and 18. The movable door 36 in this embodiment comprises a completely removable panel 68 with spring clips 70 which mate with openings 72 in the side panels 14 and 16, at least one of the clips 70 may have locking means 74 therewith to permit the user to secure the door 36 from attempted removal. The panel 68 also has the lower opening 44 therein to permit egress of any cord(s) to appropriate electrical appliances. The securement means such as the aforementioned "L"-shaped flange 22, is shown in FIG. 3 as attached to the outlet receptacle 11 for maximum rigidity of the unit when it is attached to the wall stud 24.

The electrical device 26 attachable to an indented enclosure box 10 need not be just an electrical socket arrangement 28, but it may be a switch which should be hidden from view or from possible inclement weather, in outdoor situations.

Utilization of the enclosure box of the present invention will permit excess electrical cord to be stored out of the way of furniture and/or appliances, and out of the way from young children's fingers, particularly if a locking means is part of the movable door 36.

Thus there has been described a unique arrangement for enclosing electrical outlets (or switches), and keep them from being obtrusive, as well as for providing storage means for electrical cords, permitting extension thereof of only as much as necessary, the remainder being held in its storage place by articulable holding means.

It is intended that the embodiments described above be interpreted as exemplary only, and not in a limiting sense.

I claim:

1. An enclosure apparatus adaptable for use in a building wall, to enclose at least the front panel of an electrical device, comprising:
    a first and second side panel attached to an upper and a lower panel having a rear panel attached therewith, comprising an enclosure box;
    means for receiving an electrical device arranged through one of said panels of said enclosure box;
    means for attaching said enclosure box to a building wall;
    securement means attached on the inside of one of said panels to hold any cord which is plugable into said electrical device received onto said enclosure box; and
    a movable door adapted to the front side of said enclosure box, so as to thereby close said enclosure box on all sides thereof.

2. An enclosure apparatus as recited in claim 1, wherein said securement means comprises a U-shaped member having a pair of arms.

3. An enclosure apparatus as recited in claim 2, wherein said arms have distal portions which are articulable with respect to the panel to which said securement means is attached.

4. An enclosure apparatus as recited in claim 1, wherein said movable door is attachable to a frame member which is fixedly secured to the front side of said enclosure box.

5. An enclosure apparatus as recited in claim 4, wherein said door moves parallel to said frame.

6. An enclosure apparatus as recited in claim 4, wherein said movable door is pivotable about one corner of said frame and swingable into mating relationship with said frame.

7. An enclosure apparatus as recited in claim 4, wherein said movable door is slidable in an arrangement of grooves in said frame.

8. An enclosure apparatus as recited in claim 7, wherein a holding means is attached to the inside of one of said panels adjacent the opening through said door, so as to securely hold any electrical cord extending therethrough.

9. An enclosure apparatus as recited in claim 7, wherein said door is lockable to said frame after said door has been closed.

10. An enclosure apparatus as recited in claim 4, wherein said door is removable from said frame member on the front side of said enclosure box.

11. An enclosure apparatus as recited in claim 4, wherein said electrical device is disposed through an arrangement of openings in one of said side panels of said enclosure box, permitting use thereof in most building walls, while minimizing the depth of the enclosure box therefor.

12. An enclosure apparatus as recited in claim 1, wherein said movable door has an opening therethrough along one edge thereof, to permit any electrical cord to extend therepast, after said door has been closed.

* * * * *